(12) United States Patent
Leem

(10) Patent No.: US 6,847,834 B1
(45) Date of Patent: Jan. 25, 2005

(54) MOBILE TERMINAL WITH A SOLAR CELL

(76) Inventor: Sung-Muk Leem, 826-8 Hwagok-dong, Kangseo-gu, Seoul (KR), 157-014

(\*) Notice: Subject to any disclaimer, the term of this patent is extended or adjusted under 35 U.S.C. 154(b) by 434 days.

(21) Appl. No.: 09/926,433
(22) PCT Filed: Jun. 30, 2000
(86) PCT No.: PCT/KR00/00698
§ 371 (c)(1), (2), (4) Date: Nov. 1, 2001
(87) PCT Pub. No.: WO01/65711
PCT Pub. Date: Sep. 7, 2001

(30) Foreign Application Priority Data

Mar. 3, 2000 (KR) ........................................ 2000-10657

(51) Int. Cl.$^7$ ............................ H04B 1/38; H04M 1/00
(52) U.S. Cl. .................. 455/572; 455/573; 455/574; 455/575.1; 455/343.5; 455/343.6; 320/101; 320/103; 320/114; 136/244; 136/245; 136/251; 136/293; 323/906; 379/433.01; 379/433.08
(58) Field of Search ................................ 455/573, 572, 455/574, 575.1, 575.3, 573.4, 343.1, 343.2, 343.5, 343.6; 379/423.01, 433.08, 433.11, 433.12, 433.13; 320/101, 108, 114, 110, 103; 136/244, 245, 293, 251; 323/906

(56) References Cited

U.S. PATENT DOCUMENTS

| | | | | |
|---|---|---|---|---|
| 4,897,873 A | \* | 1/1990 | Beutler et al. | 379/433.13 |
| 5,260,885 A | \* | 11/1993 | Ma | 361/681 |
| 5,341,082 A | \* | 8/1994 | Lorenzen et al. | 320/165 |
| 5,579,388 A | \* | 11/1996 | Endroes et al. | 379/433.08 |
| 5,792,279 A | \* | 8/1998 | Tsuboi et al. | 136/245 |
| 5,793,184 A | \* | 8/1998 | O'Connor | 320/101 |
| 5,898,932 A | \* | 4/1999 | Zurlo et al. | 455/573 |
| 5,932,994 A | \* | 8/1999 | Jo et al. | 323/222 |
| 5,936,380 A | \* | 8/1999 | Parrish | 320/101 |
| 6,006,103 A | \* | 12/1999 | Van Lerberghe | 455/575.3 |
| 6,084,379 A | \* | 7/2000 | Buniatyan | 320/101 |
| 6,131,018 A | \* | 10/2000 | De Crouy-Chanel et al. | 455/572 |
| 6,448,489 B2 | \* | 9/2002 | Kimura et al. | 136/244 |
| 6,665,550 B1 | \* | 12/2003 | Muller | 455/575.1 |

FOREIGN PATENT DOCUMENTS

| | | | | |
|---|---|---|---|---|
| DE | 19521135 | \* | 11/1996 | H04B/1/38 |
| JP | 04-113408 | \* | 4/1992 | G06F/1/26 |
| JP | 06046537 A | \* | 2/1994 | H02J/7/35 |
| JP | 06046538 A | \* | 2/1994 | H02J/7/35 |
| JP | 11-187581 | \* | 9/1999 | H02J/7/00 |
| KR | 97-31465 | \* | 6/1997 | H04B/7/26 |
| KR | 98-77664 | \* | 11/1998 | H04B/7/26 |
| KR | 99-15363 | \* | 3/1999 | H02J/7/02 |

\* cited by examiner

Primary Examiner—Lester G. Kincaid
Assistant Examiner—Ismael Quiñones
(74) Attorney, Agent, or Firm—Piper Rudnick LLP

(57) ABSTRACT

A mobile terminal with a solar cell is disclosed. The mobile terminal has a main body, a battery and a flip cover. A receiver portion, a data display and a keypad are formed on the upper surface of the main body. The improvement comprises a solar cell attached to the outer surface of the flip cover to be exposed to the outside. According to the present invention, there is provided the mobile terminal having a solar cell, which is capable of providing sufficient electric power to the mobile terminal while the mobile terminal is positioned in a normal state where the upper surface of the mobile terminal is directed upward.

6 Claims, 7 Drawing Sheets

MOBILE TERMINAL WITH A SOLAR CELL

This is a nationalization of PCT/KR00/00698 filed Jun. 30, 2000 and published in English.

TECHNICAL FIELD

The present invention relates, in general, to a mobile terminal with a solar cell and, more particularly, to a mobile terminal to the flip cover of which a solar cell is attached.

BACKGROUND ART

As well known to those skilled in the art, since a mobile terminal is generally carried in a user's pocket or around a use's neck, it is desirable that a mobile terminal is light in weight and small in size.

In the meantime, the technology of obtaining a lightweight and small-sized battery for the mobile terminal has been pursued through the development of a nickel-cadmium (Ni—Cd) battery, a nickel-hydrogen (Ni—H) battery, a lithium-ion (Li-ion) battery, etc. However, since the battery technology lags behind the technology of developing a semiconductor that is mounted in the main body of the mobile terminal, there occurs a problem in which the battery of the mobile terminal is heavier and larger than the main body of the mobile terminal.

In order to improve the performance of the battery, the inventor of the present invention proposed the invention of Unexamined Korean Pat. Publication No. 98-87892 entitled Storage Battery with a Solar Cell for a Mobile terminal". The patent discloses a battery that allow the battery to be charged by various light, thereby reducing inconvenience of charging the battery.

However, since the battery of the patent is formed by attaching one or two solar cells to one or two surfaces of the battery, the battery must be detached from the mobile terminal or the mobile terminal must be turned upside down to be charged by light, thereby increasing the inconvenience of charging the battery using light.

Additionally, Korean Pat. Publication No. 94-3280 entitled "Mobile terminal with a Solar Cell and Power Supply thereof" discloses a mobile terminal in which a solar cell is provided on the upper surface of the mobile terminal together with an data display that is always exposed to the outside, thereby allowing the battery to be charged by light in a normal state.

However, since the solar cell is disposed together with a receiver portion in the vicinity of the data display on the upper surface of the mobile terminal, there occurs a shortcoming in which the size of the solar cell is limited. As a result, the solar cell is not practicable to the mobile terminal that consumes a great deal of electric power because the mobile terminal must produce the high frequency output of 600 mW.

DISCLOSURE OF THE INVENTION

Accordingly, the present invention has been made keeping in mind the above problems occurring in the prior art, and an object of the present invention is to provide a mobile terminal having a solar cell, which is capable of providing sufficient electric power to the mobile terminal while the mobile terminal is positioned in a normal state where the upper surface of the mobile terminal is directed upward.

In order to accomplish the above object, the present invention provides a mobile terminal having a main body, a battery and a flip cover, a receiver portion, a data display and a keypad being formed on the upper surface of the main body, wherein the improvement comprises a solar cell attached to the outer surface of the flip cover to be exposed to the outside.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
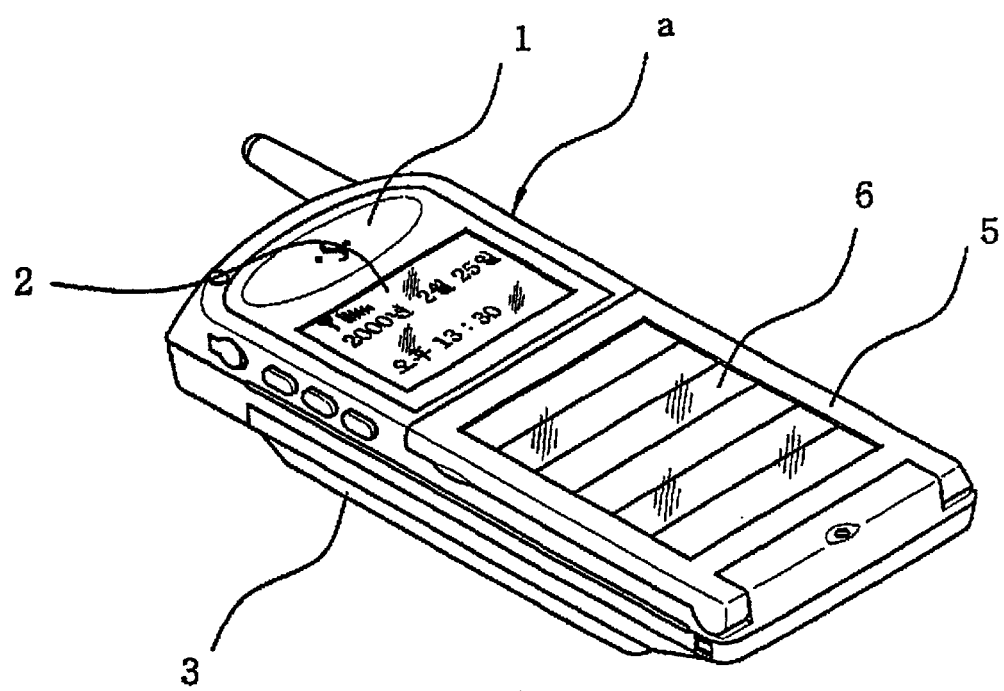
FIG. 1 is a perspective view showing the appearance of a mobile terminal with a solar cell in accordance with an embodiment of the present invention.

Reference now should be made to the drawings, in which the same reference numerals are used throughout the different drawings to designate the same or similar components.

As depicted in FIG. 1, a mobile terminal in accordance with the present invention generally comprises a main body "a", a battery 3 and a flip cover 5. A receiver portion 1, a data display 2 and a keypad are formed on the upper surface of the main body "a". In accordance with a feature of the present invention, a solar cell 6 is attached to the outer surface of the flip cover 5 to be exposed to the outside.

When the mobile terminal of the present invention is deposited on a desk or the top of the dashboard of an automobile in a normal state where the data display 2 is directed upward, light reaches the solar cell 6 and the solar cell 6 generates electricity using the light. According to the present invention, since the solar cell 6 can be disposed all over the entire outer surface of the flip cover 5, the solar cell 6 can generate sufficient electricity necessary for charging the battery 3 of the mobile terminal. The electricity generated by the solar cell 6 may be supplied from the solar cell 6 of the flip cover 5 to the main body "a" through contacts 7 and 7' or a flexible cable 8. The electricity supplied to the main body "a" is supplied to the battery 3 detachable to the main body "a", and the battery 3 is charged with the electricity.

The solar cell 6 may be fabricated of one of various materials such as silicon (Si), gallium arsenide (GaAs), cadmium sulphide (CdS), indium phosphide (InP) and combinations thereof. However, the solar cell 6 is preferably formed of silicon from an economical point of view. Of course, since an open-end photo voltage is about 0.55V per each element of the silicon solar cell, the solar cell 6 must be used in conjunction with a booster circuit 11 for increasing the open-end photo voltage of about 0.55V to the electric source voltage of the mobile terminal of a range of 3.8V to 6V.

Figure 2:
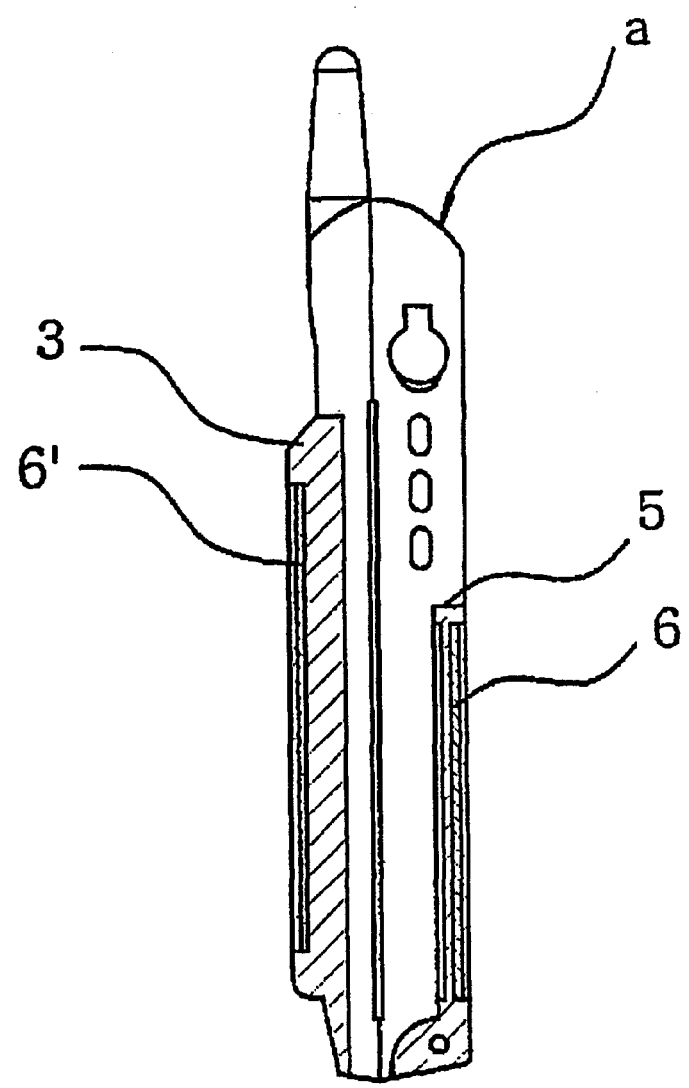
FIG. 2 is a partially sectioned side view showing a mobile terminal in accordance with another embodiment of the present invention.

If the mobile terminal of the present invention is utilized together with the above-described "Storage Battery with a Solar Cell for a Mobile terminal" disclosed by Unexamined Korean Pat. Publication No. 98-87892, there can be obtained the improved convenience of charging battery. That is, if a battery with a solar cell 6' at its rear surface is mounted to the main body of the mobile terminal of the previous embodiment, the charging of the battery can always be performed through any surface of the mobile terminal exposed to the outside. Such an example is described in FIG. 2.

Figure 3:
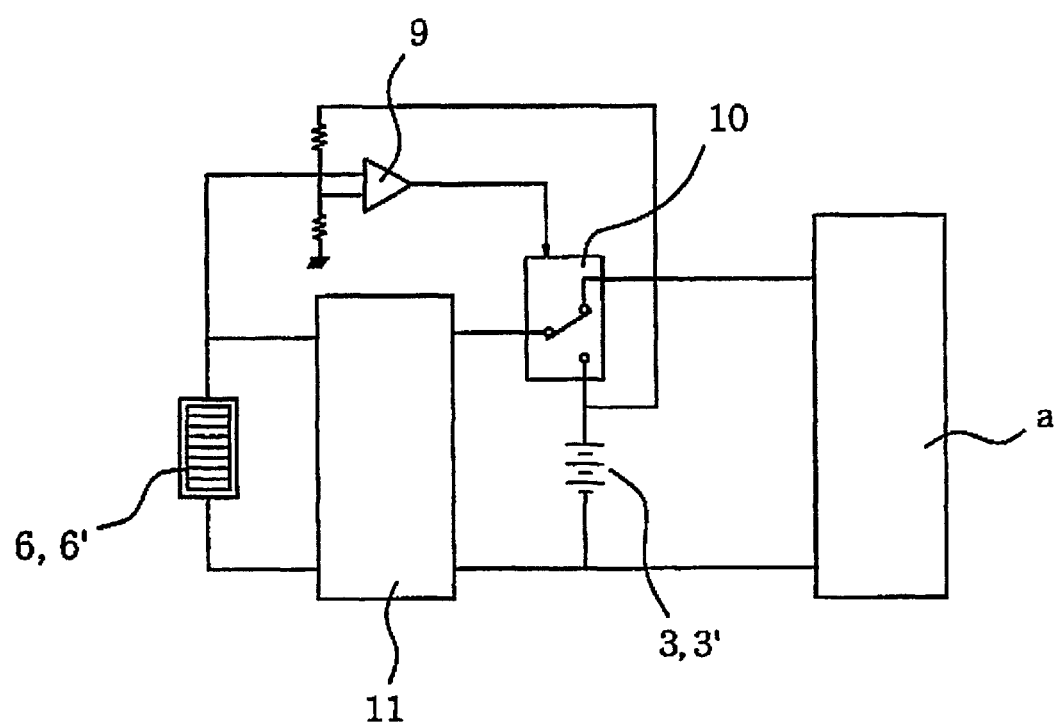
FIG. 3 is a circuit diagram of another embodiment in which electricity is supplied for standby for the receipt of message.
Figure 4:
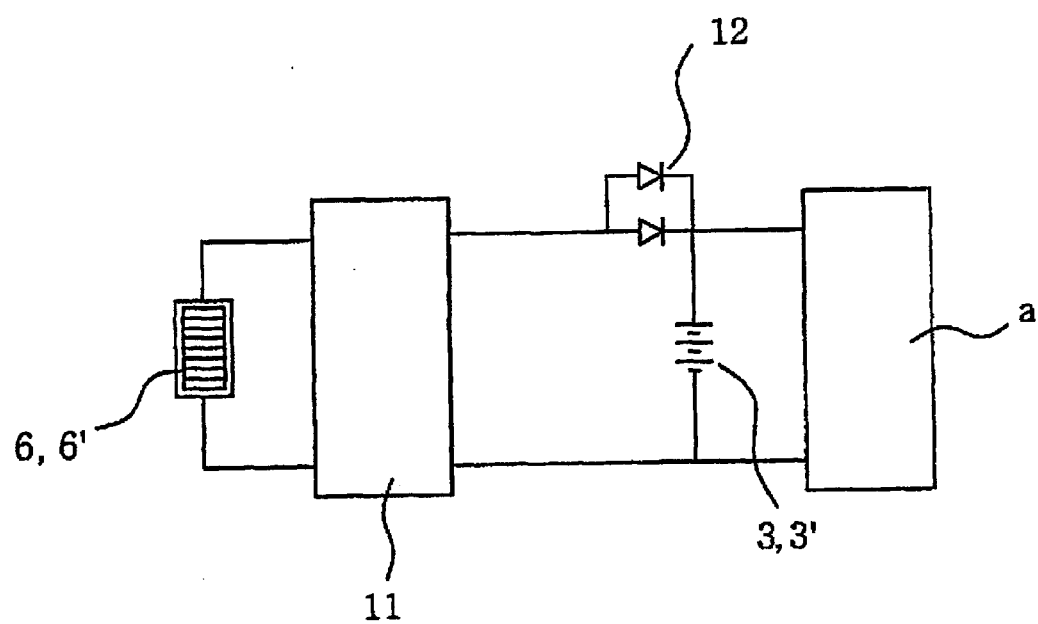
FIG. 4 is a circuit diagram of another embodiment in which electricity generated by a solar cell is supplied to a main body and a battery at the same time.

In the meantime, since the solar cell 6 can obtain the light of strong energy when the solar cell 6 is exposed to a direct ray of light, the solar cell 6 can perform the sufficient generation of electric power in this case. If it is determined by a comparator 9 that a voltage generated by the solar cell 6 is greater than a predetermined voltage, the solar cell 6 is rendered not to supply electricity to the battery 3 by a semiconductor relay 10 and simultaneously the solar cell 6 is rendered to supply to the main body "a" sufficient electricity necessary for standby for the receipt of message, as shown in FIG. 3. In addition, if a voltage generated by the solar cell 6 is greater than the output voltage of the battery 3, the solar cell 6 is rendered to supply electricity to both the battery 3 and the main body "a" through one or more diodes 12, as shown in FIG. 4.

Figure 5:
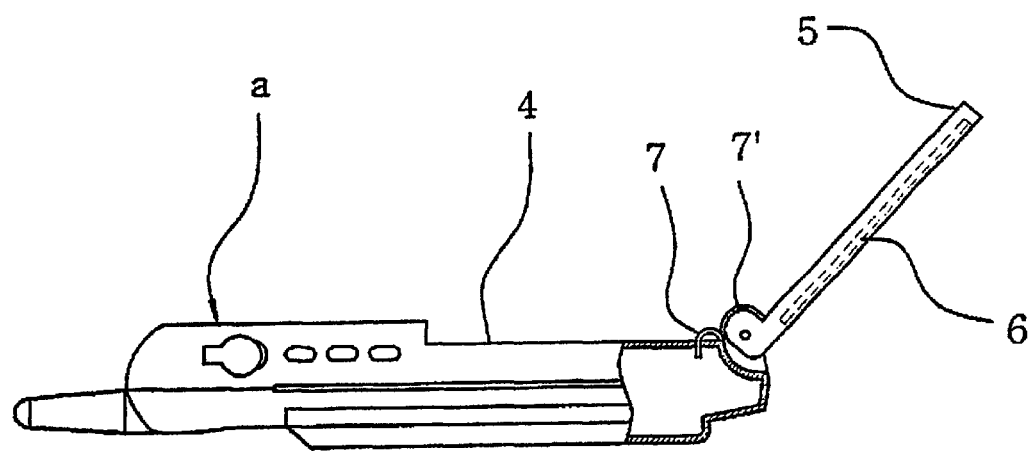
FIG. 5 is a side view showing contacts connecting the solar cell of a flip cover and a main body to each other.

In the present invention, a fixed contact 7 and a movable contact 7' may be disposed so as to transmit electricity from the solar cell 6 of the flip cover 5 to the main body "a". In more detail, as illustrated in FIG. 5, the movable contact 7' is disposed on the lower inner end of the flip cover 5 and the fixed contact 7 is disposed on the lower inner end of the keypad 4 of the main body "a", so that electricity generated by the solar cell 6 can be supplied to the main body "a" for standby for the receipt of message or for the charging of the battery 3.

Figure 6:
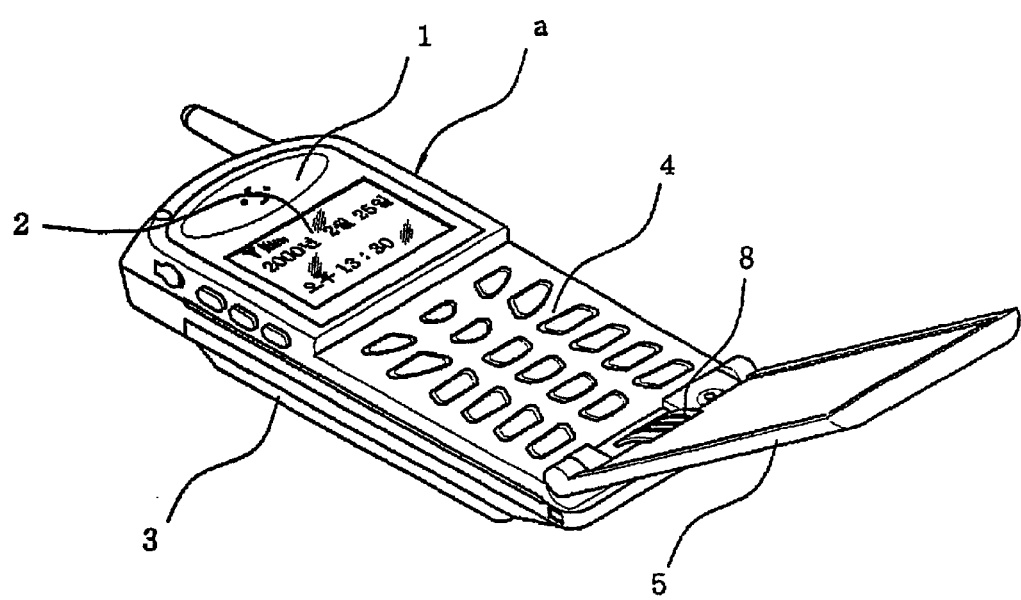
FIG. 6 is a perspective view showing a flexible cable connecting the solar cell of a flip cover and a main body to each other.
Figure 7:
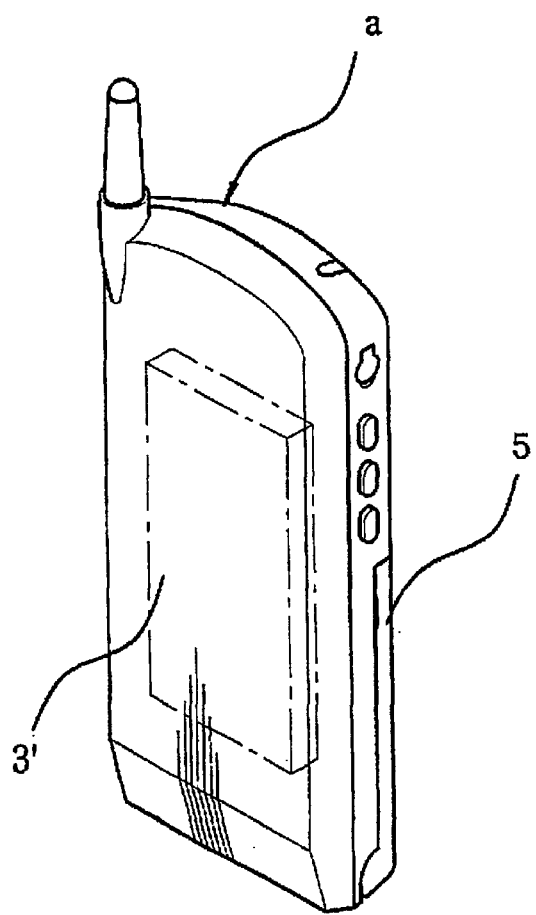
FIG. 7 is a perspective view showing a mobile terminal of another embodiment in which its battery is disposed and sealed in its main body.

Furthermore, for the transmission of electricity from the solar cell 6 of the flip cover 5 to the main body "a", a flexible cable 8 may be utilized. That is, as shown in FIG. 6, the lower inner end of the main body "a" and the solar cell 6 of the flip cover 5 are connected to each other by the flexible cable 8.

In accordance with a further embodiment of the present invention, a lithium-ion battery 3' is disposed and sealed in the main body "a", the lithium-ion battery 3' is continuously charged with electricity by the solar cell 6 during standby for the receipt of message and the main body "a" is supplied with electricity by the lithium-ion battery 3' during a call, thereby utilizing the lithium-ion battery 3' in a fixed state.

Meanwhile, according to the present invention, since the battery is charged by the solar cell 6 from time to time, a lithium-ion battery without a memory effect or the other conventional batteries having such characteristics may be preferably utilized for the mobile terminal of the present invention.

Although the examples in which the present invention is applied to mobile terminals are depicted in the drawings, the present invention, of course, can be applied to various movable communication terminals, such as a cordless phone, a Portable Digital Assistant (PDA) that performs communication through a data link kit, a palmtop computer and the like.

INDUSTRIAL APPLICABILITY

As described above, the present invention provides a mobile terminal with a solar cell, which is capable of obtaining electricity simply by depositing the mobile terminal on a desk or table or hanging the mobile terminal around a user's neck, thereby supplying electricity for standby for the receipt of message and the charging of its battery. As a result, the consumption of the battery can be minimized, so that the usable period of the battery is considerably increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile terminal comprising:
   a main body;
   a receiver portion;
   a data display and a keypad formed on an upper surface of said main body;
   a flip cover for covering or exposing said keypad;
   a battery attached to a lower surface of said main body;
   a solar cell attached to an outer surface of said flip cover so as to be exposed to an external environment for generating a voltage when light is received;
   a connection element electrically connecting said solar cell to said main body;
   a comparator for comparing the voltage generated by said solar cell with a predetermined voltage;
   a voltage booster circuit for boosting said voltage generated by said solar cell; and
   a semiconductor relay coupled to said voltage booster circuit and to said comparator, said semiconductor relay, in response to said voltage generated by said solar cell being greater than the predetermined voltage, for rendering said solar cell so as not to supply electricity to said battery and simultaneously rendering said solar cell to supply the boosted voltage from said voltage booster circuit to said main body for signal reception standby.

2. The mobile terminal as set forth in claim 1, wherein said connection element is a flexible cable.

3. The mobile terminal as set forth in claim 1, wherein said connection element includes a fixed contact on a lower end of said main body upper surface, and a movable contact on a lower inner end of said flip cover so as to be movable along said flip cover and in electrical contact with said fixed contact.

4. The mobile terminal as set forth in claim 1, further comprising a second solar cell attached to a rear surface of said battery so as to be exposed to an external environment.

5. The mobile terminal as set forth in claim 1, wherein said predetermined voltage is an output voltage of said battery.

6. The mobile terminal as set forth in claim 1, further comprising at least one diode coupled between said voltage booster circuit and said main body, said solar cell being rendered to supply electricity to both said battery and said main body through said diode if said voltage generated by said solar cell is greater than an output voltage of said battery.

* * * * *